United States Patent Office 3,392,623
Patented July 16, 1968

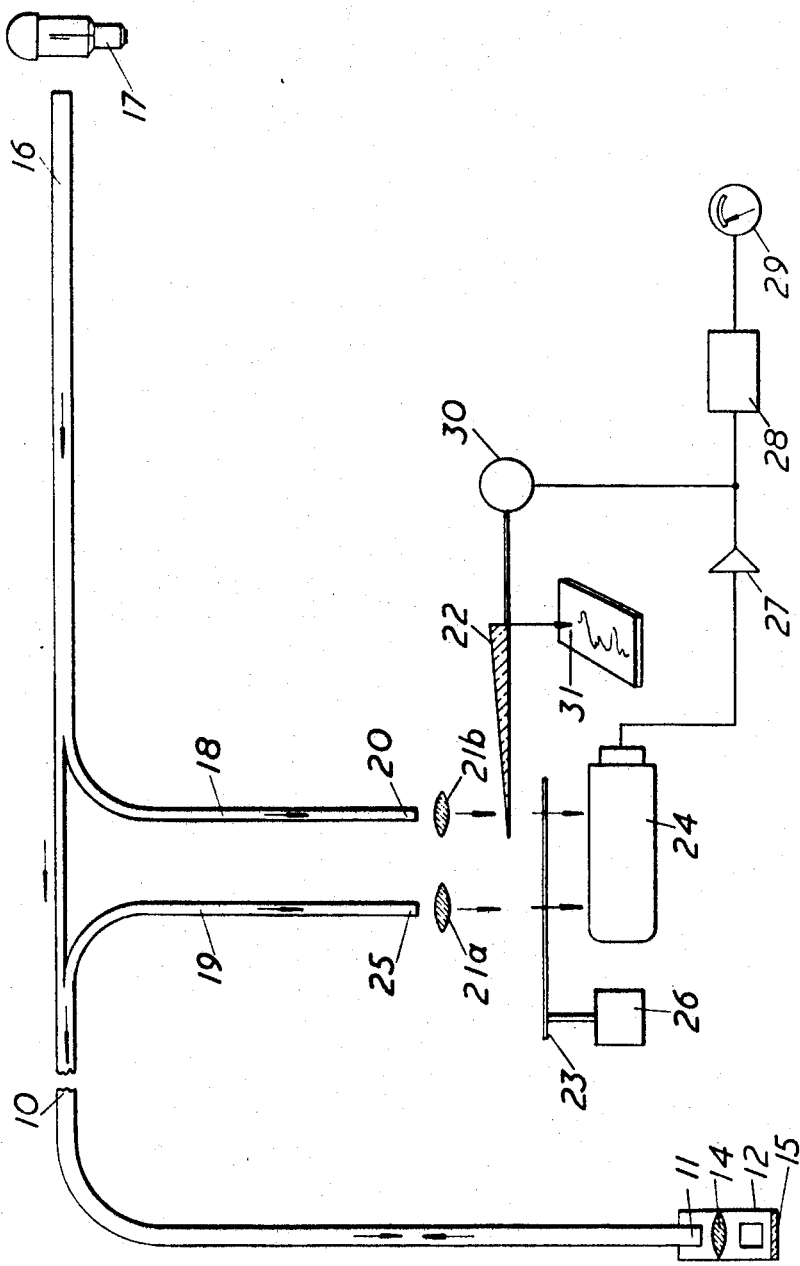

3,392,623
ABSORPTIOMETRIC APPARATUS
Peter Walker, Edinburgh, Scotland, and James Hambleton, Gateshead, England, assignors to Joyce Loebl & Company Limited, Gateshead, England
Filed Oct. 9, 1964, Ser. No. 405,010
Claims priority, application Great Britain, Oct. 11, 1963, 40,112/63
1 Claim. (Cl. 88—14)

ABSTRACT OF THE DISCLOSURE

A probe at the end of an elongated bundle of optical fibres is placed in a sample to be tested; light is passed into the sample through one branch of the fibres, reflected by a mirror and transmitted to a comparator by another branch of the fibres so that the light received by the comparator via the liquid is directly reflected rather than merely diffused.

---

This invention is for improvements in or relating to spectral or optical absorptiometric measurements and apparatus for making such measurements.

At present it is necessary when making optical or spectral absorptiometric measurements of a sample or specimen to pour the sample from a test tube into a measuring curvette or cell. The curvette or cell is then placed in the measuring beam of an optical-electronic or other absorptiometer and the extinction or degree absorption of the light is given by an indicating instrument or meter forming part of the absorptiometer apparatus. This meter may, for example, be calibrated directly in density units. The absorptiometer may include an adjustable control device by which a balanced condition can be brought about between a reference beam and a beam which has been subjected to absorption by the sample. The degree of adjustment necessary to bring about this condition of balance is a measure of the density or other property of the sample under investigation.

One object of the present invention is to provide an absorptiometric measuring apparatus which does not necessitate the pouring of the sample to be tested from a test tube or other vessel into a measuring cell or curvette.

According to the present invention there is provided an absorptiometric apparatus comprising a probe adapted to be immersed in a sample to be tested, said probe including part of an optical system comprising an elongated bundle of optically transparent fibres by which light is transmitted through the sample to a measuring and/or indicating means and thereat evaluated by comparator means.

One preferred embodiment of the present invention makes use of what is known as fibre optics. In fibre optics light is transmitted along a "rope" of elongated bundles of optically transparent fibres, the light following the path defined by the "rope" or bundles even although the latter may be bent, curved or twisted. In such an optical fibre device each of the very large number of individual fibres which make-up the "rope" or bundle comprises a very fine "thread" or filament of glass or quartz having a skin or sheath of glass or quartz which has a different refractory index to that of the "thread" or filament.

According to a further feature of the present invention, therefore, there is provided an absorptiometric apparatus comprising an optical fibre device having one of its ends in the form of a probe or the like adapted to be immersed in or otherwise presented to the sample to be tested, said probe including or being associated with a reflector, positioned so as to reflect back light passing through the sample, and the optical fibre device being split or divided at a position remote from the probe to provide two ends one of which is adapted for presentation to a light source and the other of which directs light, reflected back along the optical fibre device by the reflector, to a measuring and/or indicating means, e.g. a photocell, photodetector or similar measuring device.

The measuring or indicating means is conveniently operated by a photo-electric or photo-multiplier device onto which the reflected light is directed.

In one preferred embodiment of the invention the optical fibre or like device is split or divided so as to provide two branches along one of which the light beam from the reflector passes (hereinafter referred to as the sample beam) and along the other of which a portion of the light from the light source passes (hereinafter referred to as the reference beam). These two beams are caused alternately to act on a photo-electric device such as a photo-multiplier. The resultant output from the photo-electric device is then amplified and used for the operation of an appropriate ratio indicator and/or meter. This arrangement has the advantage of inherent high stability.

One particular embodiment of the invention will now be described by way of example with reference to the accompanying diagram.

Referring to the diagram the apparatus comprises the optical fibre device 10 to the end 11 of which a probe 12 is attached. The probe is in the form of a casing or cell open at its sides and includes a collimating lens 14 and a mirror or other reflector 15.

At the end 16 of the optical fibre device, remote from the probe 15, there is provided a light source which includes a monochromator 17 of special light source plus gelatine and interference filters.

The optical fibre device is split, in the vicinity of its end 16, so as to provide two branches 18 and 19. The end 20 of the branch 18 is directed into optical alignment with a lens 21b, an optical attenuator (e.g. a neutral gray wedge) 22, a chopper 23 and a photo-multiplier 24.

The end 25 of the branch 19 is in optical alignment with a lens 21a and the chopper 23 and with the photo-multiplier 24.

The chopper 23 is driven by an electric motor 26 and the arrangement is such that beams of light issuing from the branches 18 and 19 of the optical fibre device are interrupted alternately and therefore caused to act alternately on the photo-multiplier 24. These beams are hereinafter referred to respectively as the reference beams and the sample beam.

The output from the photo-multiplier is taken to an amplifier 27 and thence to a phase sensitive detector 28 and an indicator 29. The output from the amplifier is also taken to a servo-motor 30 adapted to adjust the optical wedge 22 in the reference beam. The wedge 22 carries a pen 31 for making a graphical representation of the movement of the wedge.

It is important that the two branches of fibres should be homogeneously mixed at the measuring sample end 11 of the optical fibre device. In other words the branches 18 and 19 both comprise individual fibres which are distributed more or less evenly throughout the cross-section of the optical fibre device, it not being sufficient merely to divide the optical fibre device into two halves and sever one-half to provide the branches 18 and 19.

The above described apparatus is operated as follows:

Firstly, the probe 12 is immersed in the test tube or other vessel containing the sample to be tested. Thus, it is not necessary to pour the sample into a special curvette or measuring cell.

Monochromatic light is then directed into the end 16 of the optical fibre device and a portion thereof travels along the optical fibre device through the lens 14 and the sample. Such light as is not absorbed by the sample is reflected back by the mirror 15 and along the branch 19 to produce the sample beam above referred to.

Another portion of the light entering the optical fibre device at its end 16 travels along the branch 18 to produce the reference beams.

The reference beam and the sample beam are interrupted alternately by the chopper 23 and directed in turn onto the photo-multiplier 24. The resultant signal is amplified, passed onto the phase sensitive detector 28 and then caused to operate the indicator 29 which may be calibrated to give a direct reading in density units. This signal also controls operation of the servo-motor 30 and the arrangement is such that the motor 30 adjusts the wedge attenuator 22 until a state of equality or balance has been achieved between the reference beam and the sample beam. When this has been effected the motor 30 stops automatically. The degree of adjustment of the wedge 22 is, of course, also a measure of the absorption properties or density of the sample. The pen 31 attached to the wedge 22 will, therefore, give a graphical record.

It will be appreciated that with the above described apparatus the probe 12 can be quite remote from the rest of the apparatus and furthermore can readily be manipulated into any position required due to the flexibility of the optical fibre device or "rope."

Furthermore the contents of a complete tray of test tubes can be quickly tested and analysed simply by transfering the probe from one test tube to the next. This represents considerable saving of time as compared with the present method of pouring a sample from each test tube into the measuring cell of a standard absorptiometer. The measuring fibres are in close contact with the solution to be measured and the system does not, therefore, have the disadvantage of the normal system of measuring solutions i.e. the necessity of having to ensure that the measuring cell is extremely accurate in its construction.

Further, it is possible with the apparatus according to the present invention to provide a continuous indication or record of a flowing liquid or gas stream to be investigated, the probe merely having to be introduced into the stream. Such an arrangement is not subject to the difficulties with present fixed sampling curvettes due to fogging or contamination by the liquid or gas stream.

A further important application of the apparatus is to the making of measurements which have to be taken on a culture which is grown over a long period of time. The head or end 11 or the probe 12 of the optical fibre device can be placed directly in the culture growth and measurements can then be carried out consistently and accurately without effecting the growth of the culture. For the measurement of such culture available heretofore it has been necessary to open the culture chamber and extract a sample and then carry out the measurement.

The apparatus according to the invention is not limited in its use to the visible range but may, for example, be adapted for use in the infra-red or ultraviolet range. Furthermore the apparatus is of particular advantage where investigations have to be carried out in an evacuated system. For instance, in the manufacture of thin dielectric films, which are produced under vacuum, reflected light from the layer is measured as the layer is being deposited on the substrate. An apparatus according to the present invention will replace the complicated optical systems heretofore required for this purpose.

In any of the embodiments of the invention above described the optical fibre device, between the probe or the like and the photo-detector or equivalent, may be replaced by an optical system or systems comprising ordinary optical components.

We claim:
1. An absorptiometric apparatus to measure the light absorption of samples comprising
    a source of light;
    an optical system including an elongated bundle of optically transparent fibres having a first branch of fibre and a second branch of fibres, one end of one of said branches of fibres being in light receiving relationship to said light source;
    a probe adapted to be immersed into the fluid sample to be tested, said probe including the other end of said one branch to transmit light from said source into said sample, one end of another branch of fibres located substantially adjacent the end of said one branch, and a mirror spaced from both said fibre ends in the probe and a collimating lens located between said fibre ends and said mirror, said mirror reflecting light directed into said sample by said one fibre branch back through said sample and into said probe end of said other branch;
    means deriving a signal from the other end of said other branch representative of light as directed into said sample and by the probe end of said one branch and reflected back to the probe end of said other branch, including a light sensitive device in light receiving relationship to said other end of said other branch;
    a further branch of fibres providing a light path connecting the light sensitive device to said source of light;
    shutter means alternately exposing said light sensitive device to said other branch and to said further branch, in repetitive sequence;
    an adjustable optical wedge inserted between said light sensitive means and said further branch; servo means controlled by the output of said light sensitive means comparing alternate outputs therefrom; means adjusting the position of said wedge so that the difference in alternate outputs is zero; and means recording a representation of the density of said wedge at said zero setting.

References Cited

UNITED STATES PATENTS 3,062,088 11/1962 Bolz _____ 88—14
3,068,742 12/1962 Hicks et al. _____ 88—14

OTHER REFERENCES

Korrer et al., Journal Optical Society of America, vol. 36, No. 1, pp. 42–46, January 1946.

Kapany et al., Journal of Optical Society of America, Fibre Optics, vol. 47, pp. 1109–1117 (December 1957), pp. 1109, 1110, 1116, and 1117 relied on.

JEWEL H. PEDERSEN, *Primary Examiner.*

B. J. LACOMIS, *Assistant Examiner.*